United States Patent Office 3,434,773
Patented Mar. 25, 1969

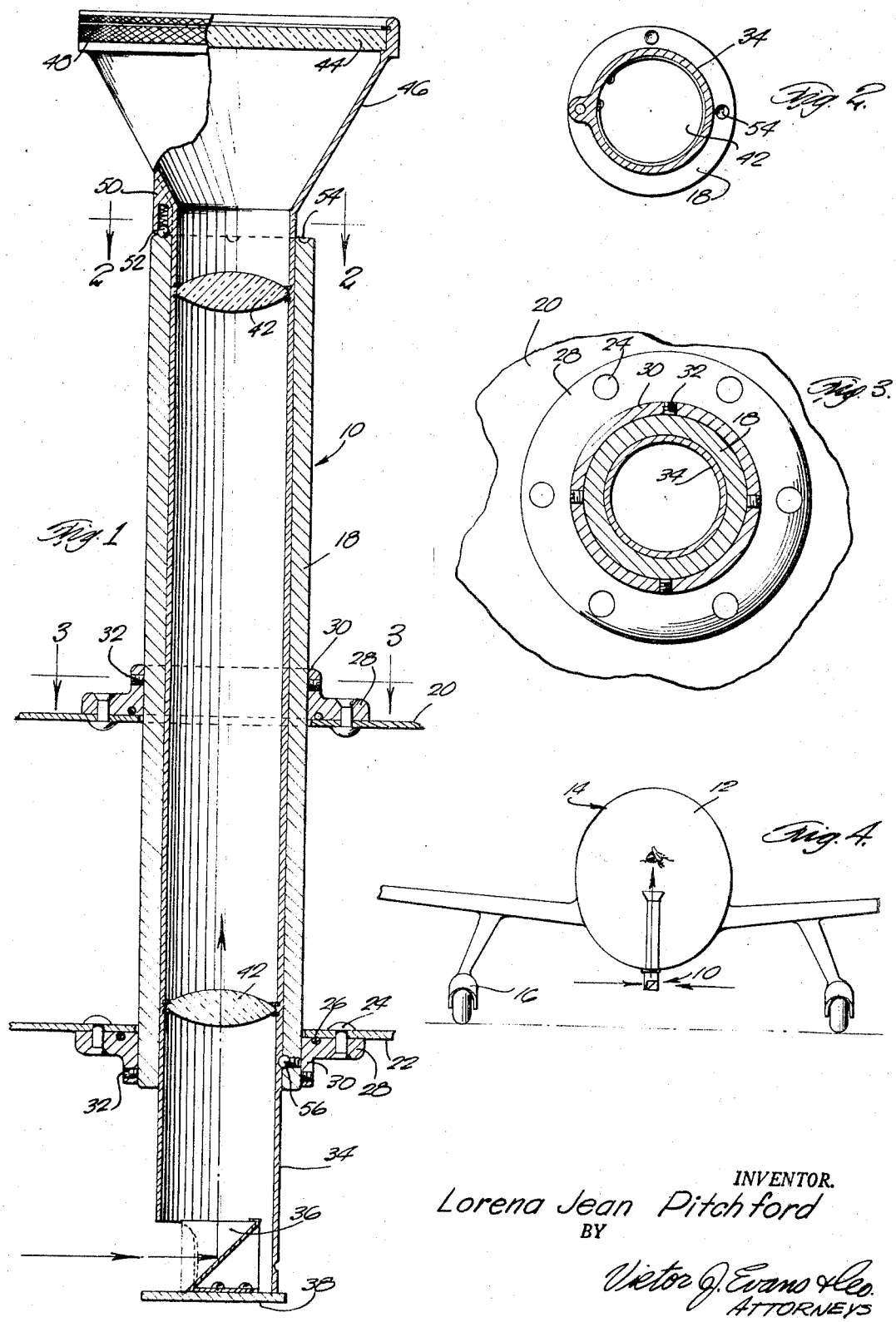
March 25, 1969     L. J. PITCHFORD     3,434,773
AIRCRAFT LANDING GEAR VIEWER
Filed July 17, 1964
INVENTOR.
Lorena Jean Pitchford
BY
Victor J. Evans & Co.
ATTORNEYS

3,434,773
AIRCRAFT LANDING GEAR VIEWER
Lorena Jean Pitchford, 612 Truman SE.,
Albuquerque, N. Mex. 87108
Filed July 17, 1964, Ser. No. 383,407
Int. Cl. G02b 23/08; B64c 25/28
U.S. Cl. 350—9                                   1 Claim

ABSTRACT OF THE DISCLOSURE

An aircraft landing gear viewer having a stationary guided tube fixedly mounted in the wall of the aircraft and communicating with the exterior thereof, a viewing tube rotatably and longitudinally mounted in the guide tube and projecting axially from each end thereof, means for viewing the exterior thereof, and means interconnecting the viewing tube and the guide tube for positioning the viewing tube in a predetermined angular position about its longitudinal axis. See FIGURE 4 of the drawing.

---

The present invention generally relates to an apparatus for viewing exteriorly of an enclosure from the inside and more particularly a viewer mounted in the fuselage of an airplane to enable the occupants of the airplane to observe the landing gear from the interior of the fuselage.

An object of the present invention is to provide a viewing apparatus for use in viewing the landing gear of an aircraft mounted rotatably in the fuselage of an airplane to enable all of the landing gear assemblies to be observed from the interior of the airplane.

A further object of the present invention is to provide a viewer including a mirror and lens system mounted in a rotatable tube having positioning means associated therewith for orientating the viewer in the several positions for observing the landing gear assemblies.

Still another object of the present invention is to provide a landing gear assembly which is simple in construction, easy to install, long lasting and relatively inexpensive to manufacture.

These and other objects and advantages of the invention will be fully apparent from the following description when taken in connection with the annexed drawings, in which:

FIGURE 1 is a longitudinal sectional view of the viewer showing the structural details thereof;

FIGURE 2 is a transverse sectional view taken along section line 2—2 of FIGURE 1;

FIGURE 3 is a transverse sectional view taken along section line 3—3 of FIGURE 1; and FIGURE 4 is a schematic view of the viewer installed in an airplane.

Referring to the drawings in detail, the viewer 10 of the present invention is mounted in a fuselage 12 of an airplane 14 for observation of the landing gear assemblies 16 from the interior of the fuselage 12.

The viewer 10 includes an elongated rigid guide tube 18 fixedly secured to the inner skin 20 and outer skin 22 of the fuselage by the use of rivets 24 or other suitable fasteners together with seals 26 for maintaining a sealed fuselage 12. The rivets 24 extend through a flange 28 of an annular mounting ring 30 which encircles tube 18 where it goes through the skins 20 and 22 of the fuselage 12. A plurality of radial set screws 32 extend through each ring 30 for releasably and adjustably securing the tube 18 in place thereby enabling the tube to be adapted to various aircraft.

Rotatably mounted in the guide tube 18 is a viewing tube 34 which extends beyond both ends of guide tube 18. At the lower end of tube 34, there is provided a viewing opening and a prism 36 mounted on an end plate 38 so that the prism will change the direction of the viewed image to parallel the center of tube 34. The tube 34 is also provided with a pair of lenses 42 and a frosted glass viewing screen 44 at the upper enlarged end thereof. The enlarged end 46 of tube 34 is knurled at 48 for easier rotation thereof when viewing the various landing gear assemblies.

Mounted on the enlarged portion 46 is a lateral bracket 50 provided with a spring loaded ball detent 52 therein for engagement with one of a plurality of circumferentially spaced recesses 54 in the end of tube 18. A similar ball detent 56 is located in the bottom ring 30 for locating tube 34 about its longitudinal axis.

By using the present invention, the pilot, copilot or other occupants of the fuselage of the airplane may observe the side landing gear assemblies as well as the nose landing gear assembly so that the position as well as the condition of the landing gear assemblies may be observed. This will eliminate considerable problems which exist due to present impossibility of observation of the landing gear in present day airplane construction.

While only a preferred embodiment of the present invention has been shown and described, other embodiments are contemplated and numerous changes and modifications may be made in the invention without departing from the spirit thereof as set forth in the appended claim.

What is claimed is:

1. A viewer for observing the landing gear of an aircraft comprising an elongated guide tube for extension through a wall of the aircraft, a pair of spaced annular mounting rings surrounding said guide tube for securing said guide tube with its axis of elongation and fixed relation to the wall of said aircraft, a plurality of radio set screws extending through each of said rings for adjustably securing said guide tube in said rings against movement along said axis of elongation, an elongated viewing tube rotatably and slidably mounted within said guide tube and extending axially from each end thereof, said viewing tube having an enlarged end portion for positioning interiorly of said aircraft, and including a lateral bracket which overhangs said guide tube and includes a spring loaded detent means for exerting force axially of said tube, a plurality of recesses circumferentially spaced about the end of said guide tube adjacent the enlarged end portion of said viewing tube for receiving said detent means to rotatably position and retain said viewing tube in a circumferentially adjusted position, a frosted glass viewing screen positioned in said enlarged end portion of said viewing tube transversely of said axis of elongation, a reflecting prism mounted in the other end of said viewing tube for changing the direction of view determined by the said axis of elongation, lens means intermediate said screen and said prism for forming an image of the aircraft landing gear on said screen when said landing gear is extended, additional spring-loaded detent means positioned in said guide tube for exerting pressure radially of said axis of elongation, and additional recess means located within and longitudinally of said viewing tube for receiving said additional detent means to permit slidable location of said viewing tube on its axis of elongation.

References Cited

UNITED STATES PATENTS

| | | | |
|---|---|---|---|
| 1,338,615 | 4/1920 | Lanius | 350—302 |
| 1,479,036 | 1/1924 | Fosdick | 350—80 |
| 1,635,011 | 7/1927 | Sadler | 350—80 |
| 2,281,102 | 4/1942 | Lowman | 350—302 |
| 2,651,969 | 9/1953 | Thor | 350—68 |
| 3,165,573 | 1/1965 | Moultrie | 350—307 |

FOREIGN PATENTS

| | | |
|---|---|---|
| 444,749 | 3/1936 | Great Britain. |
| 719,251 | 4/1942 | Germany. |

RONALD L. WIBERT, *Primary Examiner.*

U.S. Cl. X.R.

350—80